United States Patent [19]

Wooten

[11] Patent Number: 4,748,700

[45] Date of Patent: Jun. 7, 1988

[54] PORTABLE ANIMAL WASTE DEVICE

[76] Inventor: Richard Wooten, 709 Kentucky Ave. SE., Washington, D.C. 20003

[21] Appl. No.: 760,903

[22] Filed: Jul. 31, 1985

[51] Int. Cl.⁴ .............................................. A47K 17/00
[52] U.S. Cl. ........................................... 4/661; 4/313; 119/1
[58] Field of Search .................... 4/661, 300, 420, 313; 119/1

[56] References Cited

U.S. PATENT DOCUMENTS

| 2,584,656 | 2/1952 | Anderson | 4/420 |
| 3,318,285 | 5/1967 | Betham | 119/1 |
| 3,603,290 | 9/1971 | O'Rork | 119/29 |
| 3,621,817 | 11/1971 | Printz | 119/1 |
| 3,656,457 | 9/1970 | Houston | 4/661 |
| 3,734,057 | 5/1973 | Lee et al. | 119/1 |
| 3,811,410 | 5/1974 | Roberts | 119/1 |
| 4,181,096 | 1/1980 | Grubman | 4/661 |
| 4,196,693 | 4/1980 | Unversaw | 119/1 |
| 4,271,544 | 6/1981 | Hammond | 4/661 |
| 4,437,430 | 3/1984 | DeBardeleben | 119/1 |

FOREIGN PATENT DOCUMENTS 2247585 5/1975 France ................................. 119/1

Primary Examiner—Henry J. Recla
Assistant Examiner—Linda J. Sholl
Attorney, Agent, or Firm—Eric P. Schellin

[57] ABSTRACT

A portable device adapted for use on a toilet seat to dispose of animal waste comprising, a sensor responsive to the animal's weight to start a timer which activates a first solenoid to release a sanitized fluid into the waste container of said device, and to subsequently activate a second solenoid to flush the toilet containing the waste.

1 Claim, 1 Drawing Sheet

U.S. Patent    Jun. 7, 1988    4,748,700
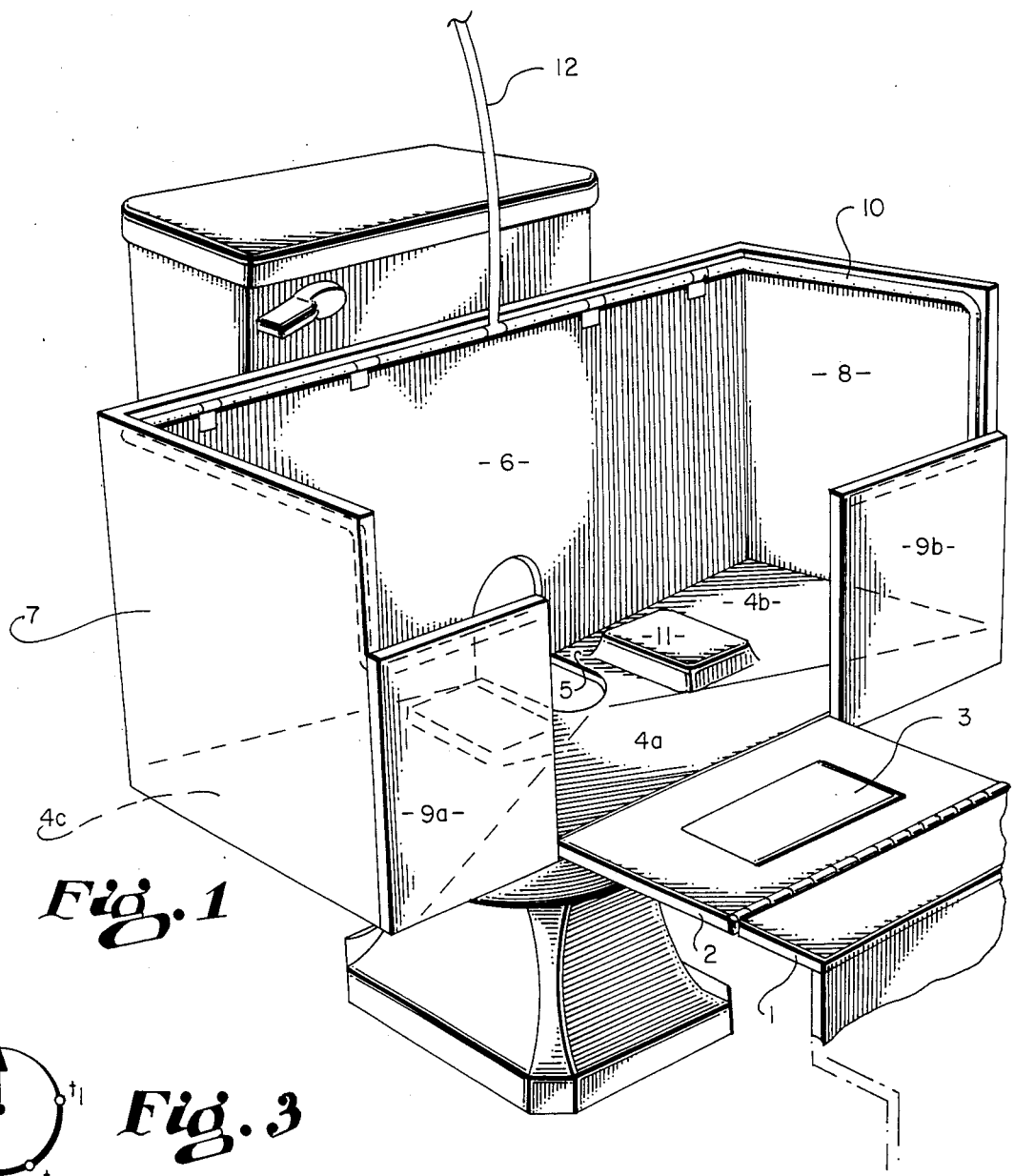
*Fig. 1*
*Fig. 3*
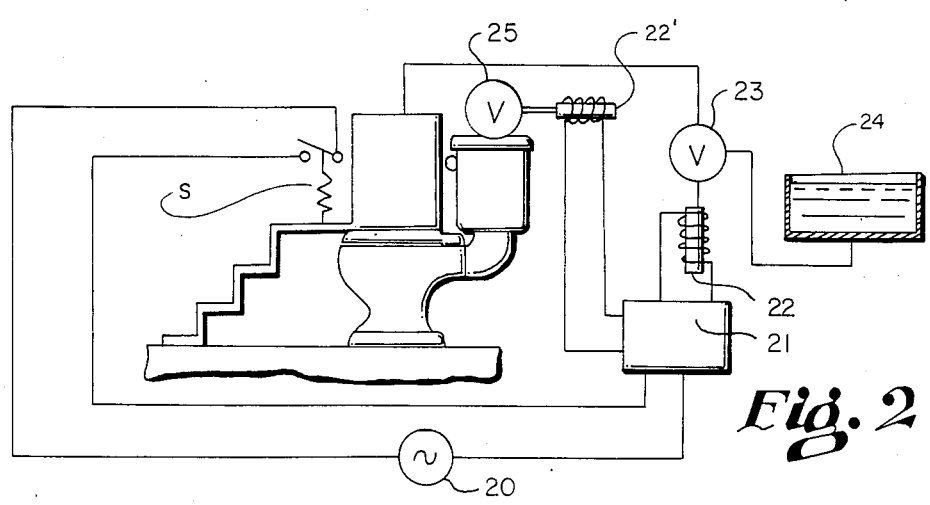
*Fig. 2*

PORTABLE ANIMAL WASTE DEVICE

BACKGROUND OF THE INVENTION

The invention relates to a portable device for use on a toilet for household pets, such as dogs and cats, which allows them to relieve themselves when in confines unattended by humans, or when the householder is disposed not to walk pets, such as dogs.

More particularly, the portable device is positioned to deposit animal waste into a toilet bowl in a dwelling occupied by humans.

In general, when a human is desirous of not walking a pet, the pet is trained to use the yard, either through a pet door or a regular door, which must be opened by a human. Further, it becomes necessary to eventually clean the yard, or, in the case of a city, the street.

If a pet is trained to use an in-house facility, when desired, the pet door, walking the pet, or even opening the door for the pet could be avoided when the pet needs to relieve itself. More important however is the fact that pollution of grounds outside of the dwelling is prevented.

SUMMARY OF THE INVENTION

The present invention allows all of the above disadvantages to be overcome because the device fits over existing toilet seats, but can be removed to accomodate regular use of the seat by humans. The pet can be easily trained to use the device because it is equipped with steps which easily lead up through a portal to the place where excrement is deposited and disposed of directly into the toilet bowl.

It is an object of the invention to provide a device for household toilets which enable a pet to excrete and which is equipped to flush the excrement into the toilet bowl.

Another object of the invention is to provide a device which enables, either by-passing the pet door or avoidance of having to open a regular door for the pet to relieve itself outside of the dwelling.

Yet another object of the invention is to provide a device which affords a human the choice of not walking a pet when desired.

A still further object of the invention is to provide a device which will prevent pollution of grounds exterior to a dwelling when a human elects not to walk a pet.

Other objects, advantages and features of the invention will become apparent in the specification and drawings which form an integral part of the invention.

DETAILED DESCRIPTION OF THE INVENTION

FIG. 1 is a three-dimensional view of a conventional flush toilet for humans, wherein the bottom wall portion of the portable device is positioned over the bowl, with the hinged steps of the device supported on the floor (not shown).

FIG. 2 is a schematic diagram of the electric circuit and associated weight sensor, timer, first and second solenoid devices and the accompanying reservoir vessel and toilet.

FIG. 3 is an enlarged version of the timer shown in FIG. 2, setting forth the points for actuating solenoids to open and close valves.

Referring to FIG. 1 the portable device is illustrated showing a cut-away of steps 1, leading to plank 2, on which sensor 3 is disposed. The plank having a sensor thereon is part of the wall of the device in the folded position. Bottom walls 4a, 4b and 4c slope towards central opening 5, which also extends in arch-like configuration into back wall 6. Perforated tubing 10 is disposed on the upper inside portions of rectangular-shaped walls 6,7,8,9a and 9b to allow sanitized fluid from a reservoir to flow down the walls to rinse liquid and solid waste on the side walls, bottom wall or mounds 11 into the bowl of the toilet. The sanitized fluid also cleanses and deodorizes these areas.

Referring to FIG. 2, the schematic diagram of the electric current illustrates a power supply 20 in which current flows upon closing of the switch in response to the animal's weight. A timer 21 responsive to a current signal from the closed switchs activates a first solenoid 22 at pre-selected period $t_1$. and the first solenoid opens valve 23 to release sanitized fluid from reservoir vessel 24 through non-perforated tubing 12 and into perforated tubing 10, to rinse liquid and solids on the side walls, bottom wall or mounds directly into the bowl of the toilet. The timer deactivates the reservoir solenoid at pre-selected period $t_2$ and this closes the valve in the sanitized fluid vessel.

The timer at pre-selected period $t_3$ activates a second solenoid 22' to open valve 25 in the toilet tank to cause flushing-away of the waste animal matter. The timer deactivates the toilet-tank solenoid at pre-selected period $t_4$ and this closes the valve in the toilet-tank.

More particularly, the pet ascends the steps and closes the weight sensitive switch which starts the timer, which is timed to release the sanitized fluid approximately 4 minutes after the switch is closed. Before the expiration of time $t_1$ or, in this case, 4 minutes, the pet places his hind legs on the mounds and relieves itself. The smooth surface sloped bottom wall of the device allows most of the waste matter to flow through the center opening in the lower rearward section of the device.

Any residual liquid and or solid waste is rinsed away by the sanitized fluid coming through the perforated tubing disposed on the upper inside portion of the generally rectangular-shaped interior walls of the device, and flows generally from an over-head reservoir containing about 2 gallons of the aqeous sanitized fluid.

The toilet-tank solenoid is timed approximately 1 minute or more after release of the sanitized rinse to flush the toilet by opening the valve in the tank.

It will be apparent to those skilled in the art that various mechanisms and circuits may be employed to carry out the invention functions described however even though an electric circuit is preferred, a hydraulic circuit of fluidic circuit would work equally as well. Various types of sensors can be employed, such as electrodes which could sense by conductivity or other measurement the weight of the animal. Also, the weight of the animal can be sensed in various mechanical, optical or electronic fashions, as by change in capacitance between plates of photoelectric cells. The described device, however, is free from hazards and is effective and utilizes a power source available at all flush toilets.

Also, various types of time delay mechanisms are available, including clock mechanisms, both electrical and mechanical to function as a timer without departing form the spirit and scope of the invention as defined by the claim hereunder.

What is claimed is:

1. A portable device for use on a toilet to dispose of waste material when operated by an animal trained to use it, said device including:

a bottom wall, a back wall, two side walls, and a front wall forming a receptacle adapted to fit on said toilet;

a central opening for disposal of the waste material into the toilet, said central opening formed in the back and bottom walls of said receptacle;

said bottom wall being sloped toward said central opening;

two mounds located on said bottom wall on opposite sides of said central opening;

a front opening formed in said front wall;

a plank having a first end and a second end, said first end of said plank being attached to said bottom wall at said front opening and extending outwardly from said receptacle, a set of steps, said second end of said plank being attached by a hinge to said set of steps;

whereby said set of steps, said plank, and said front opening allow said animal to enter said receptacle;

a flushing system including a power source, a timer, first and second solenoids, first and second valves actuated by said first and second solenoids, a reservoir vessel, a perforated tube, and a non-perforated tube connecting said reservoir vessel to said perforated tube via said first valve;

said perforated tube being located on the top inner side of said front, back and side walls, said reservoir vessel containing water for flushing waste material from said receptacle;

said second valve being associated with said toilet to flush said toilet;

said plank having a sensor triggered by said animals' weight to start said flushing system;

whereby actuation of said sensor by said animal causes said timer at a preselected time $t_1$ to activate said first solenoid which opens said first valve which allows water from the reservoir vessel through said non-perforated tube to said perforated tube to flush said waste material from said side and bottom walls into said central opening and to deactivate said first solenoid at a preselected time $t_2$; said timer at a preselected time $t_3$ activates said second solenoid which opens said second valve to flush said toilet and to deactivate said second solenoid at a preselected time $t_4$.

* * * * *